United States Patent
Zhu

(10) Patent No.: US 11,106,406 B2
(45) Date of Patent: Aug. 31, 2021

(54) PRINTING DEVICE AND COMMUNICATION PROCESSING SYSTEM

(71) Applicant: BROTHER KOGYO KABUSHIKI KAISHA, Nagoya (JP)

(72) Inventor: Feng Zhu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/026,077

(22) Filed: Sep. 18, 2020

(65) Prior Publication Data

US 2021/0089251 A1 Mar. 25, 2021

(30) Foreign Application Priority Data

Sep. 20, 2019 (JP) .............................. JP2019-171704

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *G06F 3/1236* (2013.01); *G06F 3/1203* (2013.01); *H04N 1/00214* (2013.01); *H04N 1/00307* (2013.01)

(58) Field of Classification Search
CPC . G06F 3/1236; G06F 3/1203; H04N 1/00214; H04N 1/00307
USPC ............................... 358/1.15, 1.13, 1.14, 1.1
See application file for complete search history.

(56) References Cited

U.S. PATENT DOCUMENTS

| | | | | |
|---|---|---|---|---|
| 2009/0189736 | A1* | 7/2009 | Hayashi | .................. G06F 21/32 340/5.81 |
| 2010/0306837 | A1* | 12/2010 | Ueno | .................... H04L 12/146 726/7 |
| 2017/0277486 | A1 | 9/2017 | Kondo et al. | |
| 2020/0310712 | A1* | 10/2020 | Kawada | ................ G06F 3/1203 |

FOREIGN PATENT DOCUMENTS

| | | |
|---|---|---|
| JP | 2017-177370 A | 10/2017 |
| JP | 2018-183901 A | 11/2018 |

* cited by examiner

*Primary Examiner* — Douglas Q Tran
(74) *Attorney, Agent, or Firm* — Kenealy Vaidya LLP

(57) ABSTRACT

A printing device includes a communication unit that executes wireless communication with an external device, a storage unit that stores information therein, and a controller that causes the storage unit to store access information of the external device that indicates a connection state where data exchange is being executed through the wireless communication, detects that the connection state of the external device changes to a disconnection state where the data exchange through the wireless communication is not executable, and uses, when the disconnection state is detected in the disconnection detection process, access information having a high priority ranking based on priorities determined with a predetermined rule among a plurality of access information stored in the storage unit to establish the connection state to the external device corresponding to the access information.

6 Claims, 12 Drawing Sheets

FIG. 5

ACCESS INFORMATION MANAGEMENT TABLE

| ACCESS ID | NUMBER OF TIMES OF CONNECTION | NUMBER OF TIMES OF DISCONNECTION | NUMBER OF DAYS ELAPSED | PRIORITY SCORE |
|---|---|---|---|---|
| Eigyou-1010-8 | 23 | 18 | 2 | 143.5 |
| Tanmatsu/801F | 8 | 1 | 7 | 76 |
| Kikaku-1012-3 | 16 | 15 | 4 | 86.75 |
| Eigyou-1010-5 | 35 | 14 | 1 | 287 |
| No.24phone | 1 | 0 | 1 | 17 |
| ... | ... | ... | ... | ... |

※ PRIORITY SCORE = 10 (= A) × NUMBER OF TIMES OF CONNECTION − 5 (= B) × NUMBER OF TIMES OF DISCONNECTION + 7 (= C) / NUMBER OF DAYS ELAPSED

PRINTING DEVICE AND COMMUNICATION PROCESSING SYSTEM

CROSS REFERENCE TO RELATED APPLICATIONS

This application is based on Japanese Patent Applications No. 2019-171704 filed on Sep. 20, 2019, the entire contents of which are incorporated herein by reference.

TECHNICAL FIELD

The present invention relates to a printing device that executes wireless communication with an external device and a communication processing system including the printing device and the external device.

BACKGROUND

A printing device that can communicate with an external device through wireless communication is known (for example, refer to JP-A-2017-177370). In the printing device (portable printer) of the related art, for example, a connection state is established with only one of a plurality of operation terminals, and a print corresponding to received print data is formed.

For example, when a printing device connected to one external device is disconnected for some reason, in order to prevent reconnection to an external device where connection to the printing device is not desirable for a connection request from this external device, it is desired for the printing device to attempt exclusive reconnection to another external device where connection to the printing device is appropriate. However, for example, an operation of determining and selecting the external device where connection to the printing device is appropriate from connectable external devices in a communication range of the printing device at the time is complicated for a user.

SUMMARY

An object of the present invention is to provide a printing device and a communication processing system, in which the convenience of a user can be improved during wireless communication between the printing device and an external device.

According to an aspect on the invention, a printing device includes a conveying unit that is configured to convey a printing medium, a printing unit that configured to perform printing on the printing medium, a communication unit that is configured to execute wireless communication with an external device through mutual recognition wireless communication, a storage unit that is configured to store information therein, and a controller that is configured to execute an access information storage process of causing the storage unit to store access information of the external device that indicates a connection state where data exchange is being executed through the wireless communication, a disconnection detection process of detecting that the connection state of the external device changes to a disconnection state where the data exchange through the wireless communication is not executable, and a connection process of using, when the disconnection state is detected in the disconnection detection process, access information having a high priority ranking based on priorities determined with a predetermined rule among a plurality of access information stored in the storage unit to establish the connection state to the external device corresponding to the access information.

In the printing device according to the present invention, whenever the external device enters the connection state through the communication unit, the access information of the external device is stored in the storage unit through the access information storage process.

For example, when one external device enters the connection state to the printing device and changes to the disconnection state (connection state) for some reason in a state where the access information of the external devices are stored, the disconnection state is detected through the disconnection detection process. The reason for the disconnection state is presumed to be, for example, a case where the external device deviates from the communication range of the communication unit of the printing device or a case where the power of the printing device is turned off.

As described above, in the present invention, when the external device changes from the connection state to the disconnection state, in the next connection process, the connection state to the external device corresponding to access information having a high priority ranking among the stored access information is automatically established again. At this time, the priority ranking is determined based on priorities determined with the predetermined rule. As a result, when the printing device and the external device change from the connection state to the disconnection state, a complicated operation on the external device side is not necessary, and the printing device and the external device can be simply reconnected.

In particular, at this time, the rule for determining the priorities is appropriately set. As a result, reconnection to the external device where connection is originally preferred, for example, the external device that is frequently connected for printing can be reliably executed. In addition, unlike a method of simply executing reconnection to the external device that is previously connected, it is also possible to prevent reconnection to the external device where connection is not preferred. As a result, the convenience of the user can be significantly improved.

According to the present invention, the convenience of a user can be improved during wireless communication between a printing device and an external device.

BRIEF DESCRIPTION OF DRAWINGS

FIG. 5 is a table illustrating an example of a storage content of an access information management table.

DESCRIPTION OF EMBODIMENTS

Hereinafter, an embodiment of the present invention will be described with reference to the drawings.

<Configuration of Printing Process System>

First, an overall configuration of a printing process system according to the embodiment will be described with reference to FIG. 1.

Figure 1:
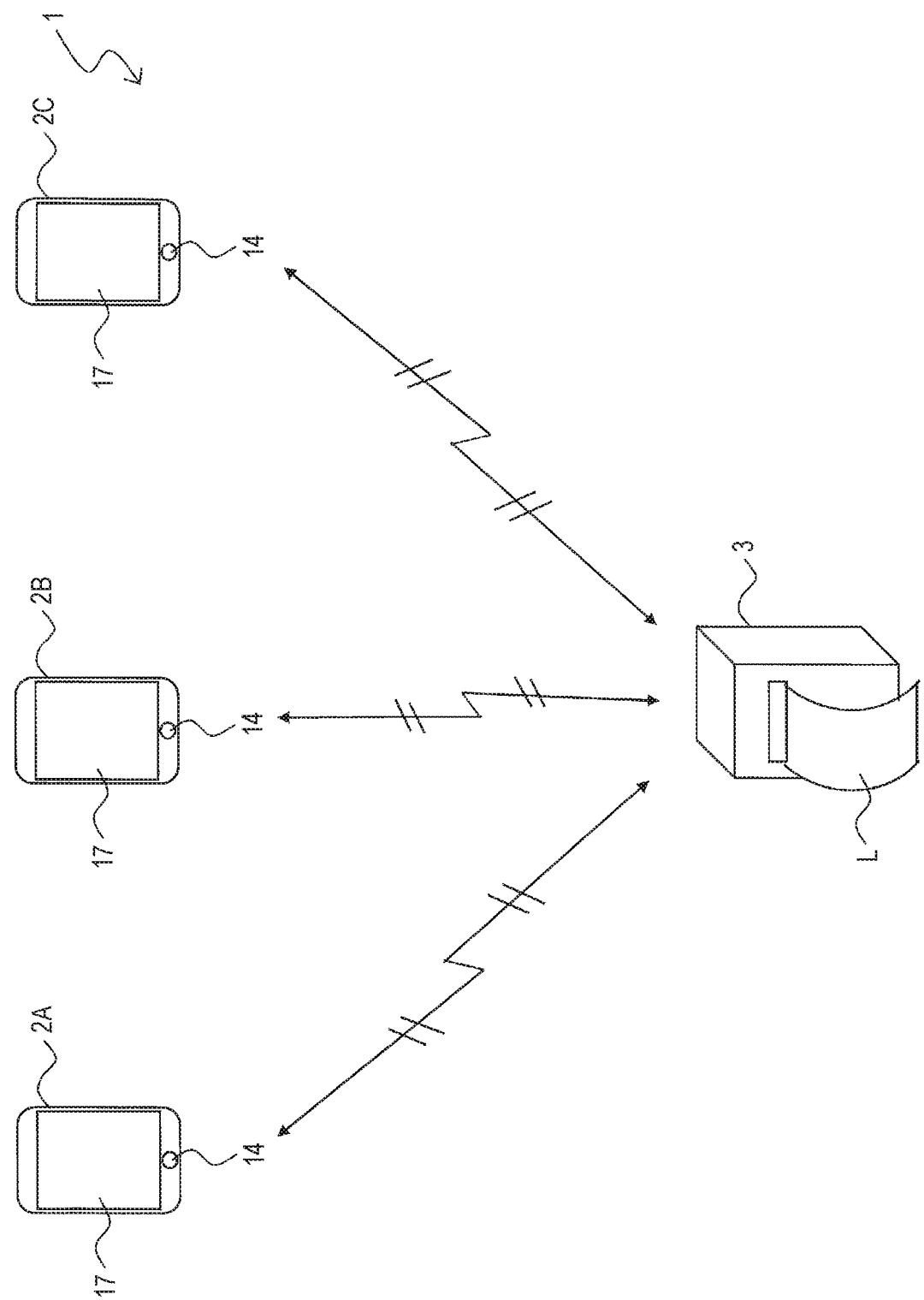
FIG. 1 is a system configuration diagram illustrating an overall configuration of a printing process system according to a first embodiment of the present invention.

As illustrated in FIG. 1, a printing process system 1 according to the embodiment includes a plurality of operation terminals, here, three operation terminals 2A, 2B, and 2C (hereinafter, when it is not necessary distinguish between "the operation terminals 2A, 2B, and 2C", "the operation terminals 2A, 2B, and 2C" will be collectively referred to as "operation terminal 2"), and a label printer 3. The operation terminal 2 and the label printer 3 are wirelessly connected to be capable of mutual communication through appropriate mutual recognition wireless communication such as Bluetooth (registered trade name). The printing process system 1 corresponds to the communication processing system described in the claims, the label printer 3 corresponds to an example of the printing device described in the claims, and the operation terminal 2 corresponds to an example of the external device described in the claims.

The operation terminal 2 is a so-called smartphone including an operation button 14 and a touch panel 17 that is a display unit having a display function and being capable of touch operation. The operation terminal 2 is not limited to a smartphone and may be a so-called feature phone, a tablet computer, a laptop computer, or a desktop computer. In addition, the display unit is not necessarily the touch panel 17.

The label printer 3 exchanges various information or instruction signals with the operation terminal 2, and generates a print label L including a print such as a desired text or image based on an operation of a user in the operation terminal 2.

Next, a functional configuration of the printing process system 1 will be described with reference to FIG. 2.

<Functional Configuration>

Figure 2:
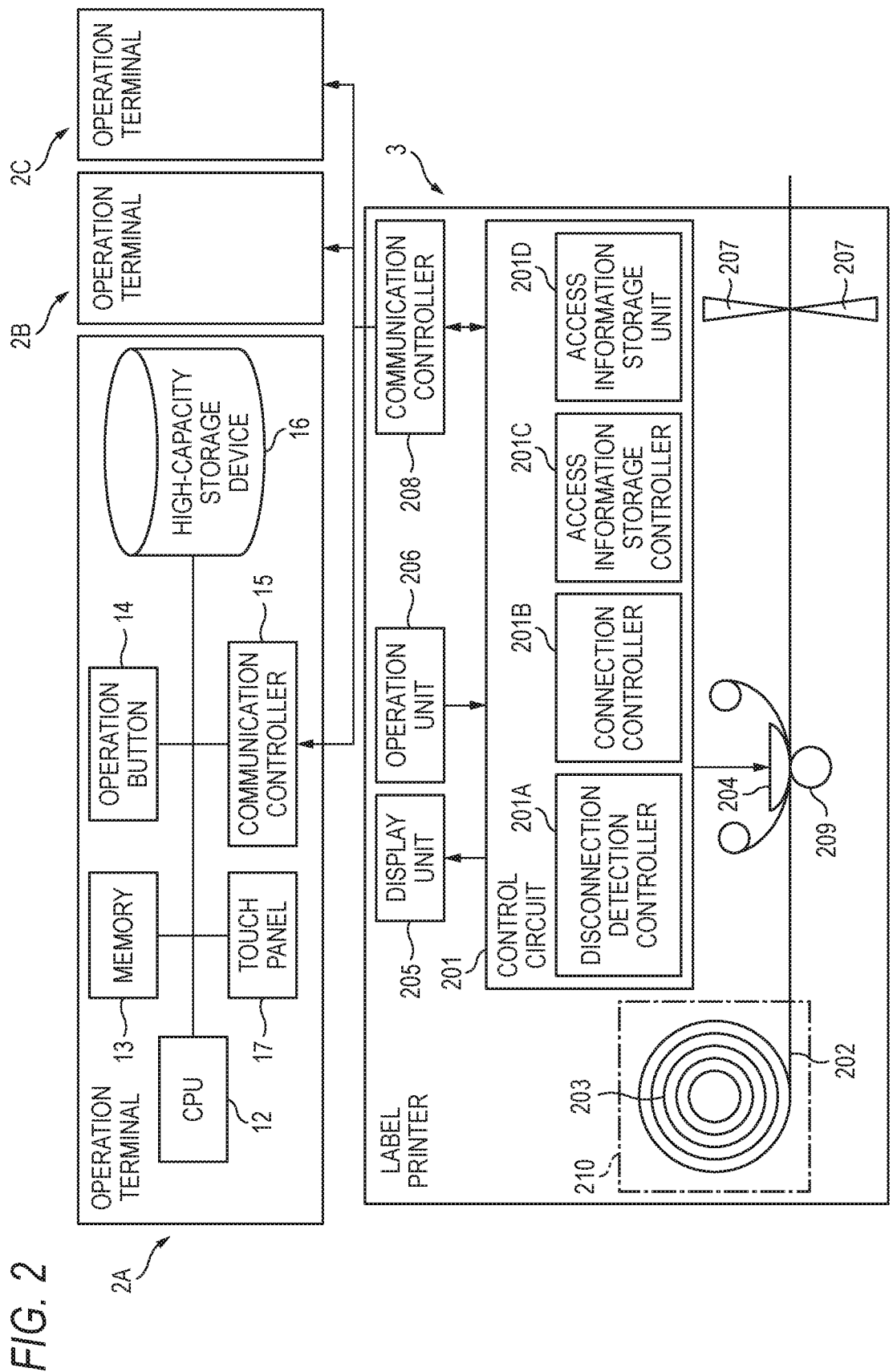
FIG. 2 is a functional block diagram illustrating a functional configuration of the printing process system.

As illustrated in FIG. 2, the operation terminal 2A includes a CPU 12; a memory 13 including a RAM and a ROM, the operation button 14, a communication controller 15, a high-capacity storage device 16 such as a flash memory, and the touch panel 17. The communication controller 15 corresponds to an example of the communication unit described in the claims, and the CPU 12 corresponds to an example of the controller described in the claims.

The RAM of the memory 13 stores, for example, print data corresponding to a desired print content to be represented by the print label L, the print data being generated by an appropriate operation of the user on the touch panel 17.

The CPU 12 executes an overall control of the operation terminal 2 by executing various programs stored in the ROM of the memory 13 or the high-capacity storage device 16 while using a temporary storage function of the RAM of the memory 13.

The communication controller 15 executes a control of communication with the label printer 3.

The high-capacity storage device 16 is, for example, a main memory but is not limited thereto. The high-capacity storage device 16 may be an appropriate external memory such as a SD memory card.

FIG. 2 does not illustrate detailed functions of the operation terminal 2B and 2C, but the operation terminals 2B and 2C have the same detailed function as the operation terminal 2A.

The label printer 3 includes a control circuit 201, a display unit 205, an operation unit 206, a communication controller 208, a tape roll holder unit 210, a print head 204, a cutter 207, and a conveying device 209. The control circuit 201 corresponds to an example of the control unit described in the claims, the communication controller 208 corresponds to an example of the communication unit described in the claims, the print head 204 corresponds to an example of the printing unit, and the conveying device 209 corresponds to an example of the conveying unit described in the claims.

The control circuit 201 is configured with a CPU, a RAM, a ROM, a flash memory, and the like, and includes a disconnection detection controller 201A, a connection controller 201B, an access information storage controller 201C, and an access information storage unit 201D. The details of the disconnection detection controller 201A, the connection controller 201B, the access information storage controller 201C, and the access information storage unit 201D will be described below. The ROM stores processing programs for causing the CPU of the control circuit 201 to execute respective procedures of the flowcharts illustrated in FIGS. 9, 10, 11, and 12.

The communication controller 208 executes a control of communication with the communication controller 15 of the operation terminal 2.

A tape roll 203 (originally having a spiral shape but schematically illustrated as a concentric circle in the drawing) around which the tape 202 is wound is detachable from the tape roll holder unit 210 (alternately, a cartridge including the tape roll 203 may be detachable therefrom). The tape 202 corresponds to an example of the printing medium described in the claims.

The conveying device 209 is provided to face the print head 204 and conveys the tape 202 that is fed from the tape roll 203.

The print head 204 forms a print on the tape 202 conveyed by the conveying device 209 based on the print data received from the operation terminal 2.

The cutter 207 cuts the tape 202 on which the print is formed into the print label L having a predetermined length.

The display unit 205 displays various information input from the control circuit 201 to the user.

The operation unit 206 inputs various information or instructions to the control circuit 201 via an operation from the user.

<Reconnection of Communication Terminal by Label Printer>

Here, as described above, the label printer 3 can communicate with a plurality of operation terminals 2 through the mutual recognition wireless communication via the communication controller 208. In this example, in accordance with Bluetooth (registered trade name) standards, the label printer 3 and a plurality of operation terminals 2 present in a communication range R of the label printer 3 at the time exchange access information each other as identification information, recognize each other, enter a pairing state where they are recognizable.

Figure 3:
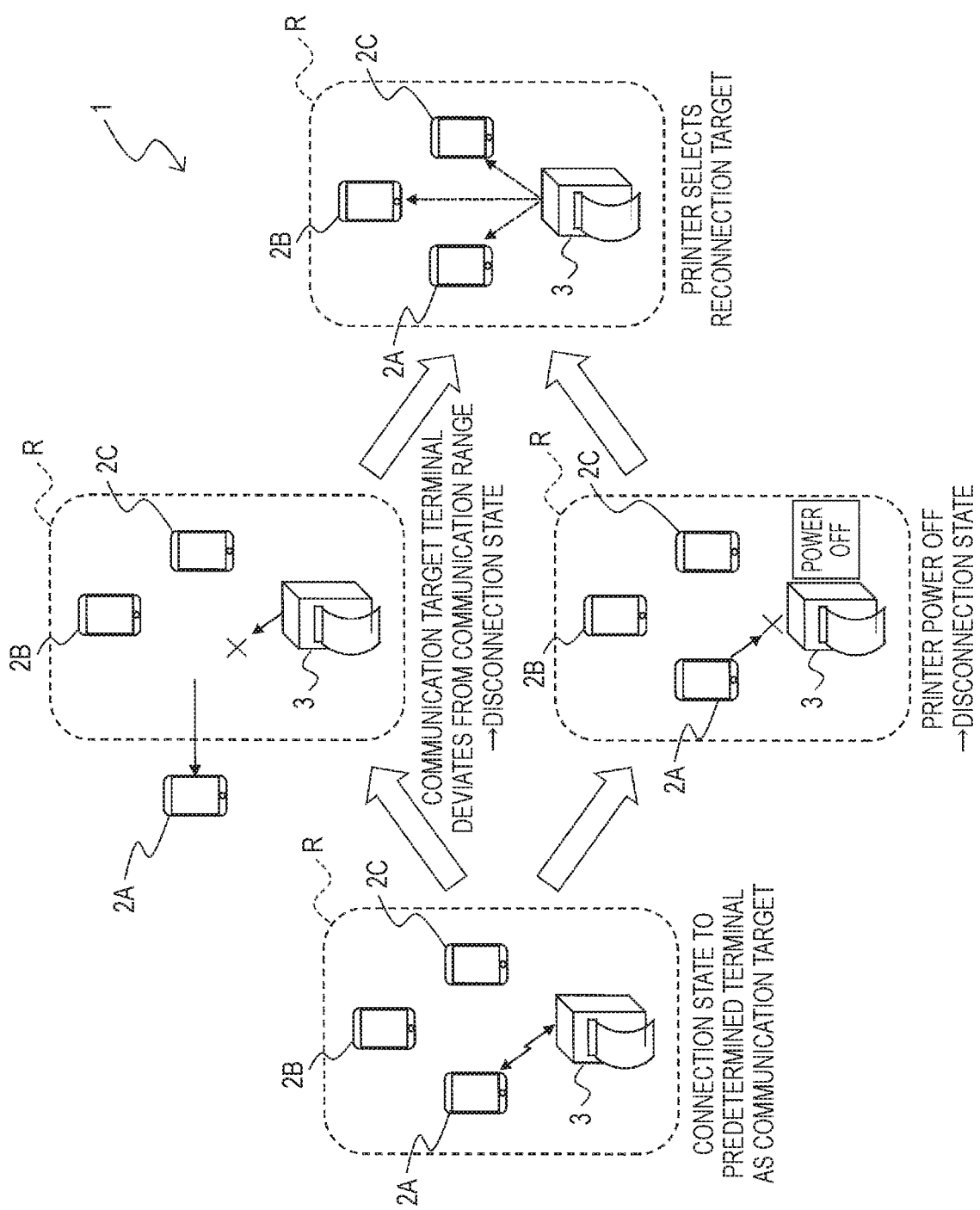
FIG. 3 is a diagram illustrating a state where a label printer attempts reconnection after changing from a connection state to a disconnection state in wireless communication between the label printer and a plurality of operation terminals.

In this state, by the user operating any one of the operation terminal 2 or the label printer 3, with a known method, the operation terminal 2 and the label printer 3 can enter a connection state where data exchange is being executed through the mutual recognition wireless communication. However, as illustrated on the left side in FIG. 3, the label printer 3 and only one operation terminal 2 among the operation terminals 2 in the pairing state can enter the connection state where information such as print data can exchange.

When one operation terminal 2 is connected to the label printer 3 as described above and then is disconnected therefrom for some reason, this disconnection state is detected in a disconnection detection process of the disconnection detection controller 201A of the control circuit 201. The reason for the disconnection state is presumed to be, for example, a case where the operation terminal 2 in the connection state deviates from the communication range R of the label printer 3 (refers to the upper center side in the drawing) or a case where the power of the label printer 3 is turned off (refer to the lower center side in the drawing). The process by the disconnection detection controller 201A corresponds to an example of the disconnection detection process described in the claims.

When the label printer 3 is disconnected for some reason as described above, exclusive reconnection to another appropriate operation terminal 2 at the earliest possible time is desirable. Connections of all the operation terminals 2 present in the communication range R of the label printer 3 to the label printer 3 are not necessarily appropriate, and the exclusive reconnection is not to receive a connection request from the inappropriate operation terminal 2.

In this case, for the user of the label printer 3, an operation of determining whether or not connection to each of the paired operation terminals 2 is appropriate based on the access information and selecting the appropriate operation terminal for reconnection is very troublesome and complicated. Therefore, in the embodiment, when the disconnection state is detected, the label printer 3 itself selects one operation terminal 2 where connection to the label printer 3 is appropriate for exclusive reconnection from the paired operation terminals 2 through a connection process of the connection controller 201B (refer to the right side in the drawing).

<Two Methods of Selecting Reconnection Target>

In the label printer 3 in the example according to the embodiment, as a method selecting the operation terminal 2 as the reconnection target in the connection process, two methods including a selection method based on registered access information and a selection method based on a priority score ranking are executed in combination.

Figure 4:
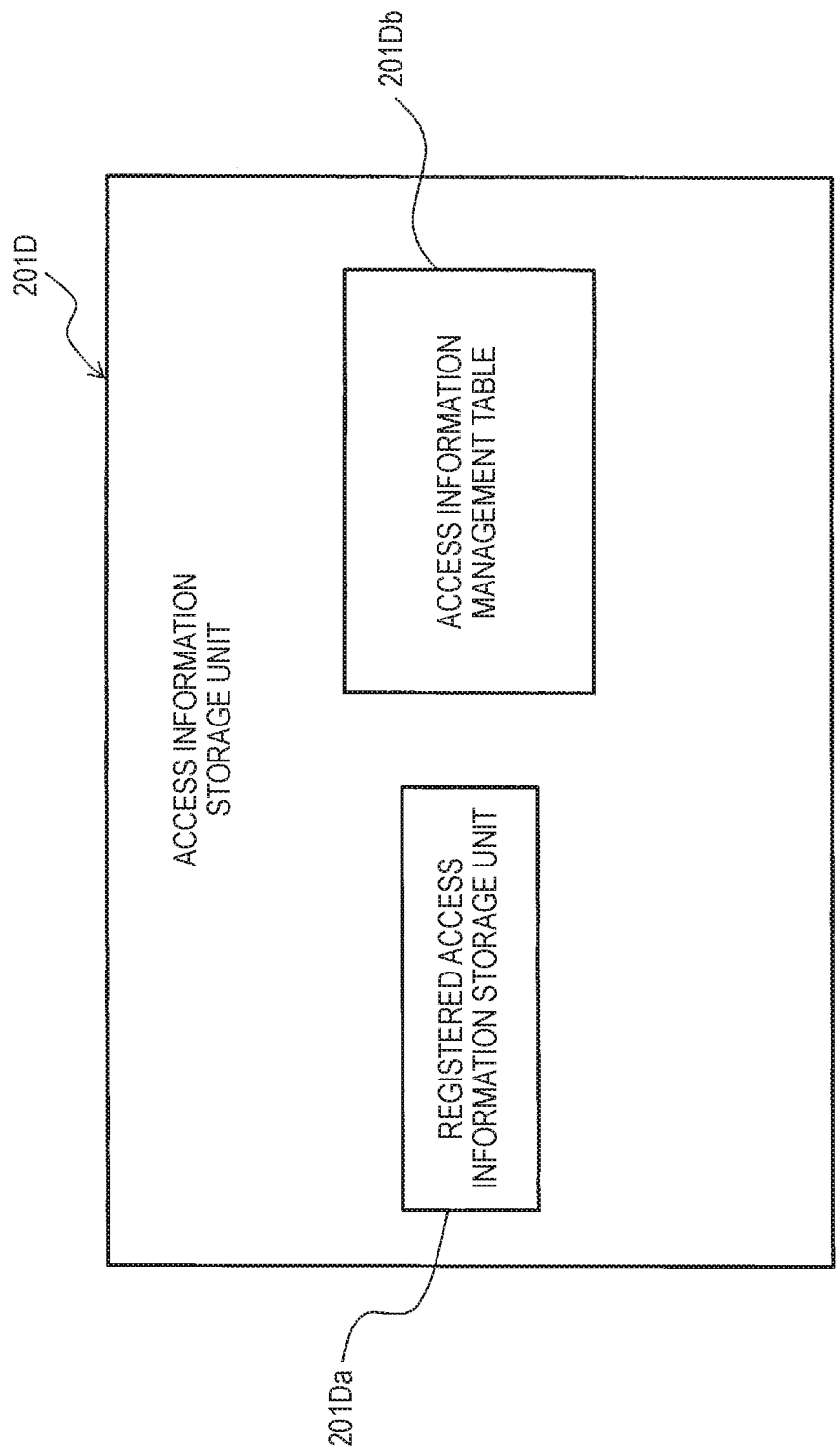
FIG. 4 is a diagram illustrating a registered access information storage unit and an access information management table storage unit provided in a storage area of an access information storage unit.

In the label printer 3 for realizing these two methods, for example, as illustrated in FIG. 4, a registered access information storage unit 201Da and an access information management table storage unit 201Db are provided in a storage area of the access information storage unit 201D. In order to maintain storage contents of the registered access information storage unit 201Da and the access information management table storage unit 201Db even after the power is turned off, it is desirable that the access information storage unit 201D is provided in a storage area of the flash memory (not illustrated) provided in the control circuit 201. The access information storage unit 201D corresponds to an example of the storage unit described in the claims.

The registered access information storage unit 201Da stores only one piece of registered access information that is freely registered and set from the user of the label printer 3 by a separate setting operation process through the display unit 205 and the operation unit 206. The registered access information is access information where connection to the label printer 3 is determined to be appropriate by the user. The registered access information may be any access information that is previously known may be set, or may be selected and set among the access information of the paired operation terminals.

In addition, the access information management table storage unit 201Db stores an access information management table where, for example, as illustrated in FIG. 5, a plurality of access information (in the drawing "access ID"; hereinafter, the same shall be applied) obtained from the previous pairing of the label printer 3 and access statuses corresponding to the access information are listed. The access information management table is recorded through a process in the access information storage controller 201C included in the control circuit 201. Since the storage capacity of the access information management table storage unit 201Db is limited, the storage capacity may be managed by limiting the number of access information to be stored or by so-called FIFO (First In First Out) where a plurality of access information are sequentially stored such that the oldest access information is deleted to store new access information. The process that is executed on the access information management table storage unit 201Db by the access information storage controller 201C corresponds to an example of the access information storage process described in the claims.

In the access information management table in the example illustrated in the drawing, a plurality of access information that are previously acquired and the number of times of connection, the number of times of disconnection, the number of days elapsed, and a priority score corresponding to each of the access information are recorded.

The number of times of connection refers to the number of times the operation terminal 2 having the corresponding access information and the label printer 3 are previously in a connection state. In other words, the number of times the operation terminal 2 uses the label printer 3 is calculated and recorded.

The number of times of disconnection refers to the number of times the connection is disconnected from the operation terminal 2 side when the operation terminal 2 having the corresponding access information and the label printer 3 are previously in the connection state. In other words, the number of times the operation terminal 2 changes from the connection state to the disconnection state irrespective of the operation of the label printer 3 is calculated and recorded.

As the number of days elapsed, the number of days elapsed from the previous day when the operation terminal 2 having the corresponding access information uses the label printer 3 is calculated and recorded.

As the priority score, a score as an index representing the priority ranking of reconnection calculated based on the number of times of connection, the number of times of disconnection, and the number of days elapsed is calculated. As a specific method of calculating the priority score, a total score is calculated by adding values that are obtained by performing appropriate arithmetic operations on the number of times of connection, the number of times of disconnection, and the number of days elapsed, respectively. In the example illustrated in the drawing, the priority score is calculated from the calculation formula "10×number of times of connection−5×number of times of disconnection+ 7/number of days elapsed" by multiplying the number of times of connection by "10" as a coefficient A, multiplying the number of times of disconnection by "−5" as a coefficient B, dividing "7" as a constant C by the number of days elapsed, adding the respective calculated values. When the priority score of the access information is the highest, the priority ranking of the label printer 3 as the reconnection target is the highest.

Here, the value of the number of times of connection relates to the frequency at which the label printer 3 is actually used previously, and as the value increases, the operation terminal 2 corresponding to the access information can be considered to be more reliable and to have a higher performance. Therefore, the coefficient A that is multiplied by the number of times of connection is set as the positive constant.

In addition, in Bluetooth (registered trade name) standards of this example, disconnection (release from the connection state) can be executed from any of the two devices in the connection state. Therefore, the value of the number of times of disconnection refers to the number of times the connection is one-sidedly disconnected due to a reason on the operation terminal 2 side, and as the value increases, the operation terminal 2 corresponding to the access information can be considered to be less reliable. Therefore, the coefficient B that is multiplied by the number of times of disconnection is set as the negative constant.

In addition, the number of days elapsed relates to the frequency at which the label printer 3 is recently used, and as the value increases, the operation terminal 2 corresponding to the access information can be considered to be less reliable and to be frequently used previously. Therefore, the constant C that is divided by the number of days elapsed is set as the positive constant.

As described above, in the label printer 3 according to the embodiment, the operation terminal 2 as the reconnection target is autonomously selected using the two methods in combination, the methods including: the method based on the registered access information that is registered by the user; and the method based on the ranking of the priority score that is calculated according to the previous access status.

<Various Reconnection Modes in which Selection Methods are Used in Combination>

In the example of the label printer 3 according to the embodiment, as reconnection modes that are executed when the operation terminal 2 as the reconnection target is selected, three modes are prepared depending on combinations of the two selection methods.

Figure 6:
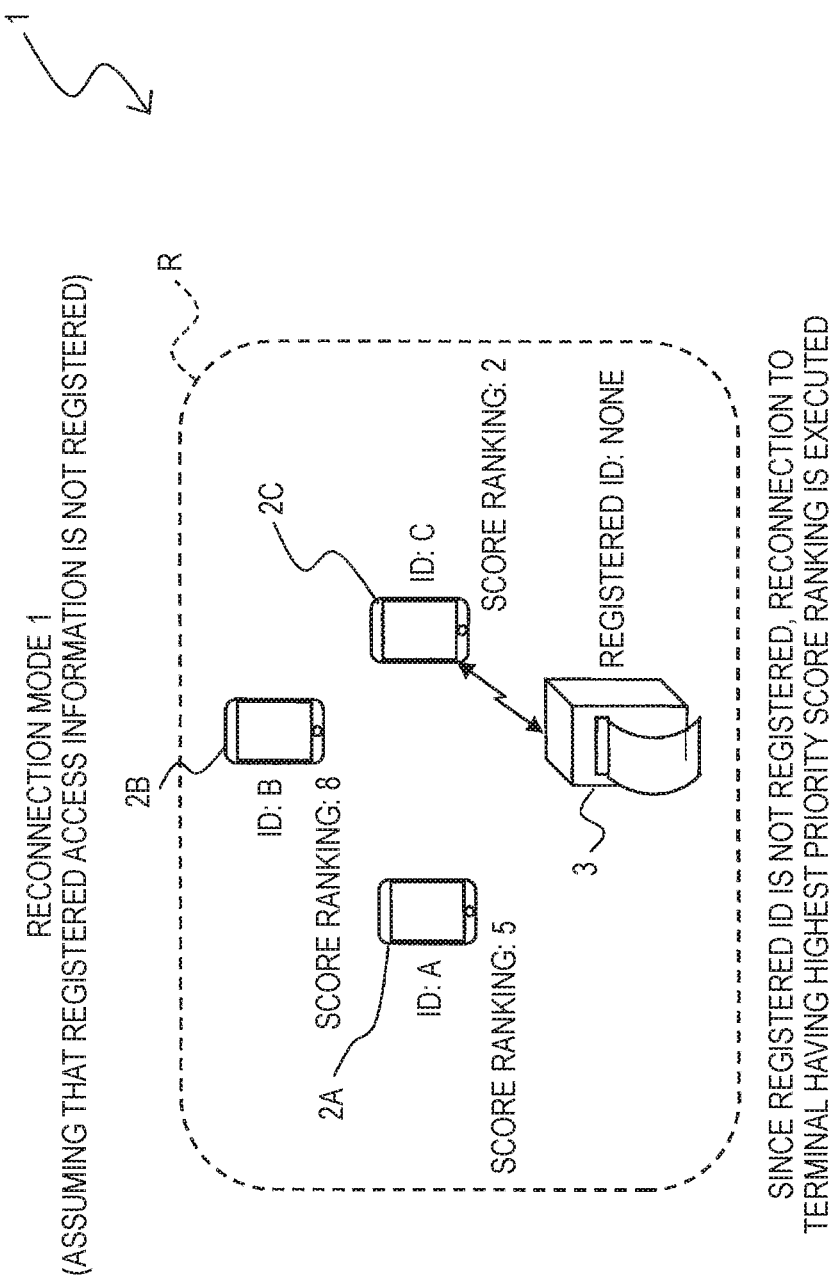
FIG. 6 is a diagram illustrating an execution content of a reconnection mode 1.

First, in a reconnection mode 1, only the method based on the priority score ranking is executed as illustrated in FIG. 6. The reconnection mode 1 is executed assuming that the registered access information (in the drawing, abbreviated as "registered ID"; hereinafter, the same shall be applied) is not registered. Therefore, from the beginning, the access information (in the drawing, abbreviated as "ID: A", "ID: B", and "ID: C"; hereinafter, the same shall be applied) of the respective operation terminals 2A, 2B, and 2C in the communication range R are detected, and the operation terminal 2C corresponding to the access information having the highest priority score ranking is reconnected as the connection target.

Figure 7:
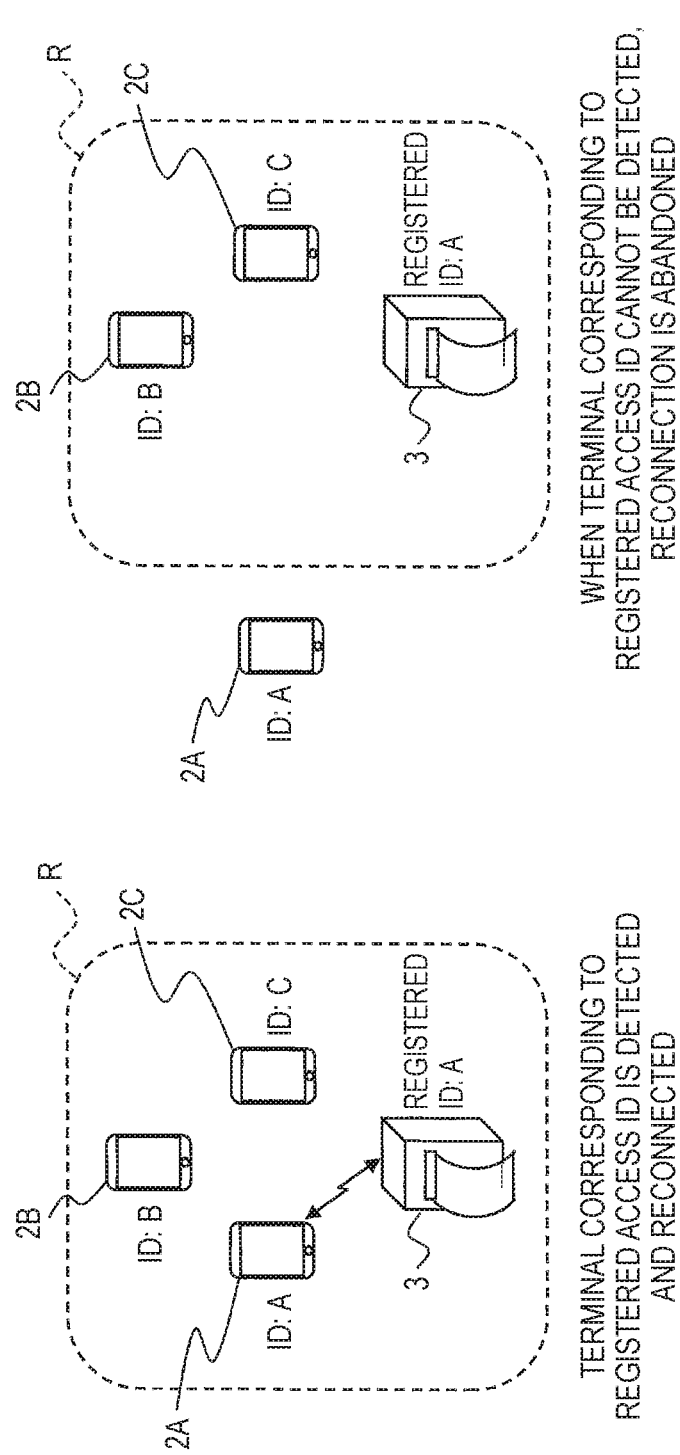
FIGS. 7A and 7B are diagrams illustrating an execution content of a reconnection mode 2, in which FIG. A illustrates a case where registered access information is detected and FIG. B illustrates a case where registered access information cannot be detected.

In a reconnection mode 2, the method based on the registered access information is executed as illustrated in FIGS. 7A and 7B. The reconnection mode 2 is executed assuming that the registered access information is registered. When access information (ID: A) that matches the registered access information (registered ID: A) is detected among the respective access information of the operation terminals 2A, 2B, and 2C detected in the communication range R, the operation terminal 2A corresponding to the access information is reconnected (refer to FIG. 7A). However, when access information that matches the registered access information cannot be detected, reconnection itself is abandoned (refer to FIG. 7B).

Figure 8:
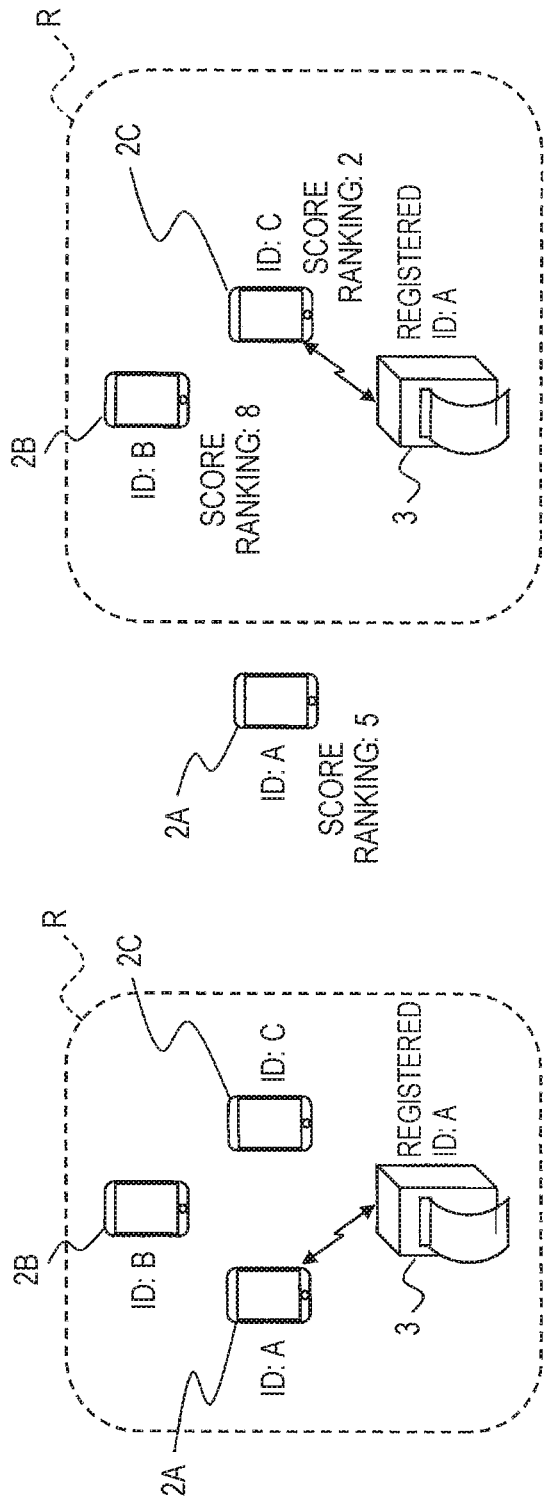
FIGS. 8A and 8B are diagrams illustrating an execution content of a reconnection mode 3, in which FIG. A illustrates a case where registered access information is detected and FIG. B illustrates a case where registered access information cannot be detected.

In a reconnection mode 3, the method based on the registered access information and the method based on the priority score ranking are switched stepwise as illustrated in FIGS. 8A and 8B. The reconnection mode 3 is executed assuming that the registered access information is registered. When access information (ID: A) that matches the registered access information (registered ID: A) is detected among the respective access information of the operation terminals 2 detected in the communication range R, the operation terminal 2A corresponding to the access information is reconnected (refer to FIG. 8A). However, when access information that matches the registered access information cannot be detected, the operation terminal 2C corresponding to the access information (ID: C) having the highest priority score ranking among the respective access information of the operation terminals 2 detected in the communication range R is reconnected (refer to FIG. 8B).

In the embodiment, any one of the three reconnection modes can be freely selected and set as described above. As described above, the degree of freedom for setting the reconnection mode of the label printer 3 through a simple operation can be improved.

<Control Procedure>

Figure 9:
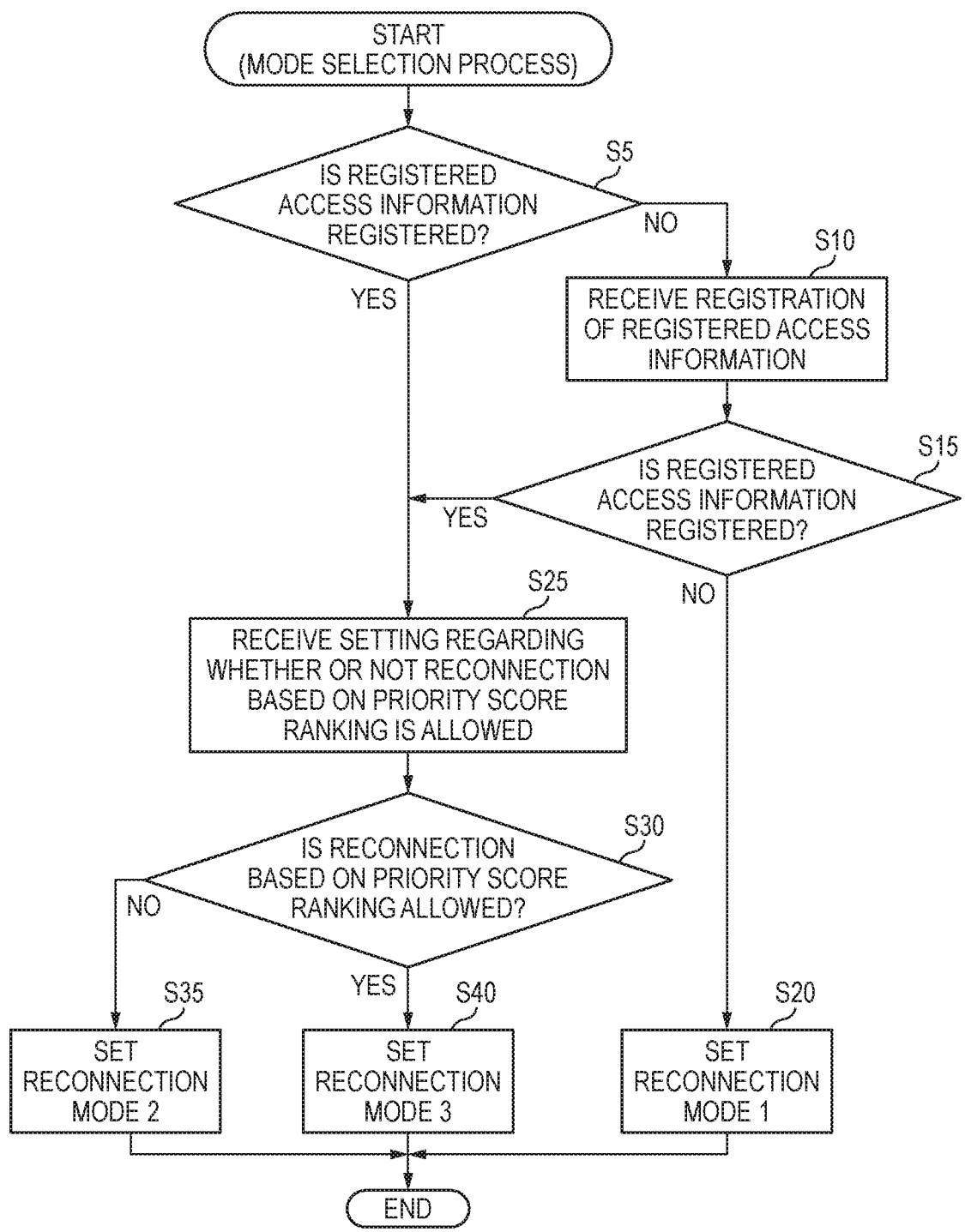
FIG. 9 is a flowchart illustrating a procedure of a mode selection process that is executed by a connection controller of the label printer.

Control procedures that are executed by the connection controller 201B of the label printer 3 in order to realize the above-described methods will be described using the flowcharts of FIGS. 9, 10, 11, and 12. The flowchart of a mode selection process illustrated in FIG. 9 is executed in advance at an appropriate timing, for example, during the activation or use of the label printer 3. When the disconnection state is detected in the disconnection detection controller 201A, any one of the flowcharts of FIGS. 10 to 12 corresponding to the reconnection mode that is selected in advance through the mode selection process is executed. Hereinafter, the control procedure when the mode selection process illustrated in FIG. 9 is executed will be described in detail.

First, in Step S5, the connection controller 201B determines whether or not the registered access information is registered in the registered access information storage unit 201da. When the registered access information is not registered, the determination is not satisfied (S5: NO), and the process proceeds to Step S10.

In Step S10, the connection controller 201B causes the display unit 205 to display that the registration of the registered access information is received, and receives the registration of the registered access information from the user through the operation unit 206. When the operation of registering the registered access information is received from the user, the registered access information is stored in the registered access information storage unit 201*da*. When the registration operation is not received, the registration is not executed.

Next, the process proceeds to Step S15. The connection controller 201B determines whether or not the operation of registering the registered access information is received from the user in Step S10. When the operation of registering the registered access information is not received from the user, the determination is not satisfied (S15: NO), and the process proceeds to Step S20.

In Step S20, the connection controller 201B sets the devices to execute the reconnection mode 1 when the disconnection state is detected, and ends the flow.

On the other hand, when the registered access information is registered in the determination Step S5 or when the operation of registering the registered access information is received from the user in the determination of Step S15, the determination is satisfied (S5, S15: YES), and the process proceeds to Step S25.

In Step S25, the connection controller 201B causes the display unit 205 to display reception of a setting regarding whether or not the reconnection based on the priority score ranking is allowed, and receives the setting regarding whether or not the reconnection based on the priority score ranking is allowed from the user through the operation unit 206.

Next, the process proceeds to Step S30, and the connection controller 201B determines whether or not the reconnection based on the priority score ranking is allowed in Step S25. When the reconnection based on the priority score ranking is not allowed from the user, the determination is not satisfied (S30: NO), the process proceeds to Step S35.

In Step S35, the connection controller 201B sets the devices to execute the reconnection mode 2 when the disconnection state is detected, and ends the flow.

On the other hand, when the reconnection based on the priority score ranking is allowed from the user in the determination of Step S30, the determination is satisfied (S30: YES), and the process proceeds to Step S40.

In Step S40, the connection controller 201B sets the devices to execute the reconnection mode 3 when the disconnection state is detected, and ends the flow.

Figure 10:
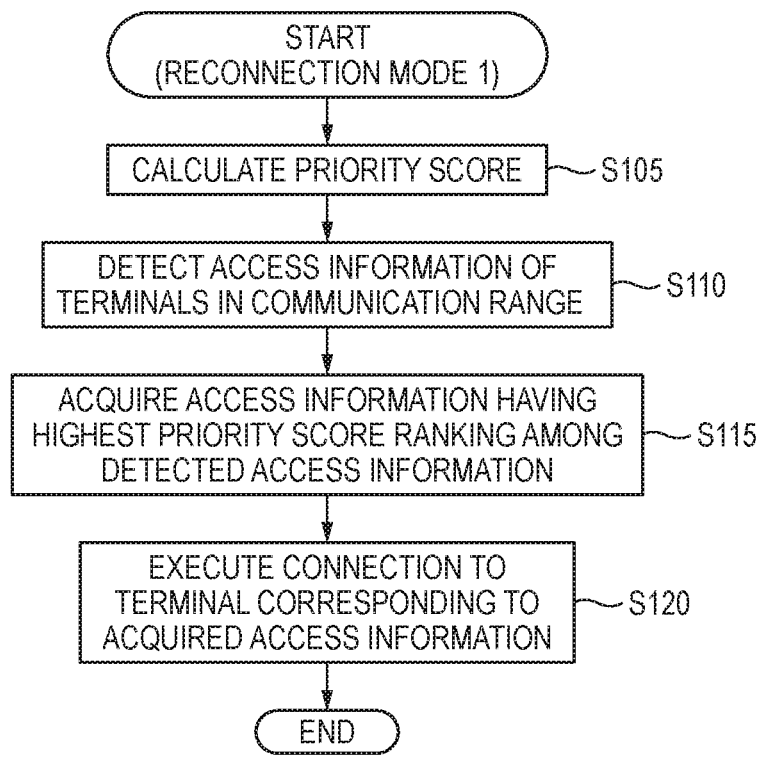
FIG. 10 is a flowchart illustrating a procedure of the reconnection mode 1 that is executed by the connection controller of the label printer.

Next, the control procedure when the reconnection mode 1 illustrated in FIG. 10 is executed will be described in detail.

First, in Step S105, the connection controller 201B calculates and updates the priority score by substituting the number of times of connection, the number of times of disconnection, and the number of days elapsed corresponding to each of the access information recorded in the access information management table into the predetermined calculation formulae.

Next, the process proceeds to Step S110, and the connection controller 201B is paired with the operation terminals 2 present in the communication range R of the label printer 3 at the time and detects the access information thereof.

Next, the process proceeds to Step S115, and the connection controller 201B acquires access information having the highest priority score ranking among the access information detected in the Step S110 from the access information management table.

Next, the process proceeds to Step S120, and the connection controller 201B transmits a connection request to the operation terminal 2 corresponding to the access information acquired in Step S115 and executes reconnection. Next, this flow ends.

Figure 11:
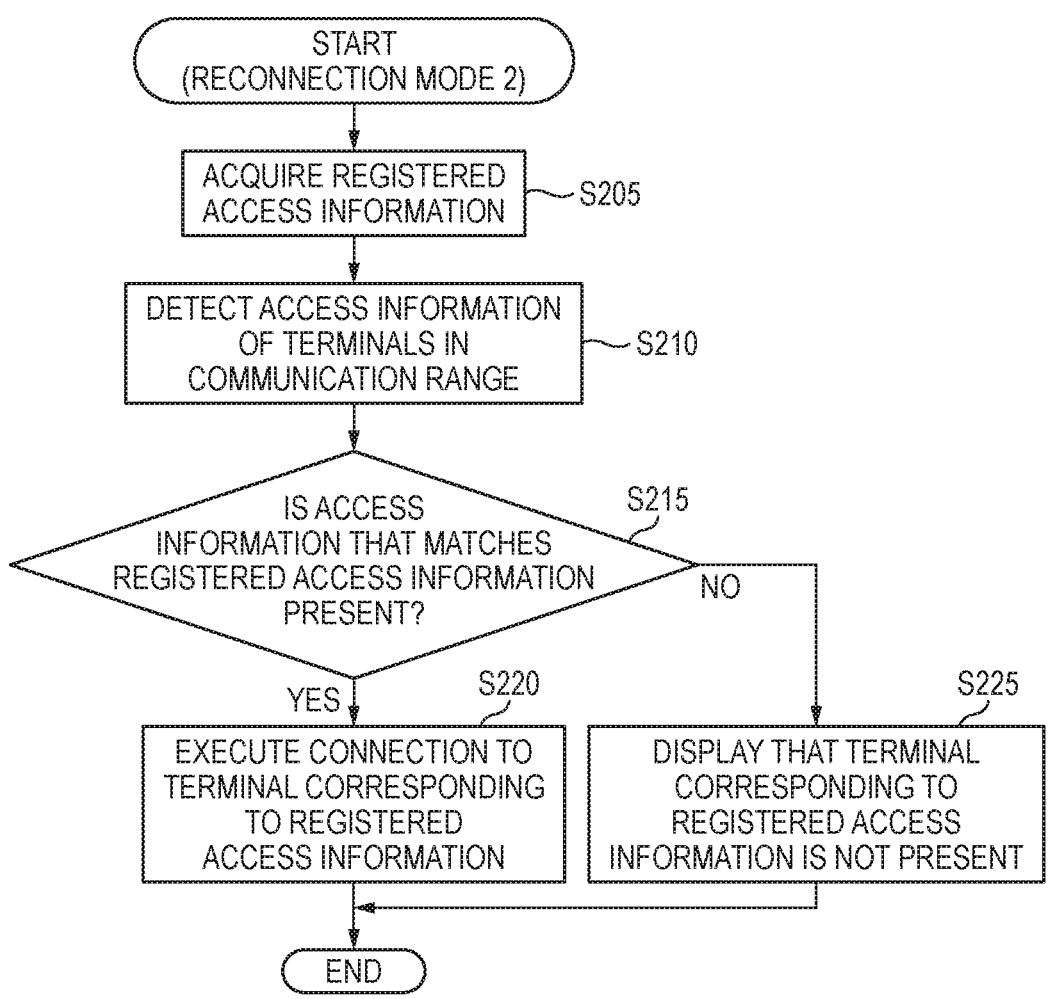
FIG. 11 is a flowchart illustrating a procedure of the reconnection mode 2 that is executed by the connection controller of the label printer.

Next, the control procedure when the reconnection mode 2 illustrated in FIG. 11 is executed will be described in detail.

In Step S205, the connection controller 201B acquires the registered access information registered in the registered access information storage unit 201*da*.

Next, the process proceeds to Step S210, and the connection controller 201B is paired with the operation terminals 2 present in the communication range R of the label printer 3 at the time and detects the access information thereof.

Next, the process proceeds to Step S215, and the connection controller 201B determines whether or not access information that matches the registered access information acquired in Step S205 is present among the access information detected in Step S210. When the access information that matches the acquired registered access information is present among the detected access information, the determination is satisfied (S215: YES), and the process proceeds to Step S220.

In Step S220, the connection controller 201B transmits a connection request to the operation terminal 2 corresponding to the registered access information and executes reconnection. Next, this flow ends.

On the other hand, When the access information that matches the acquired registered access information is not present among the detected access information in the determination of Step S215, the determination is not satisfied (S215: NO), and the process proceeds to Step S225.

In Step S225, the connection controller 201B causes the display unit 205 to display that the operation terminal 2 corresponding to the registered access information is not present, and ends the flow.

Figure 12:
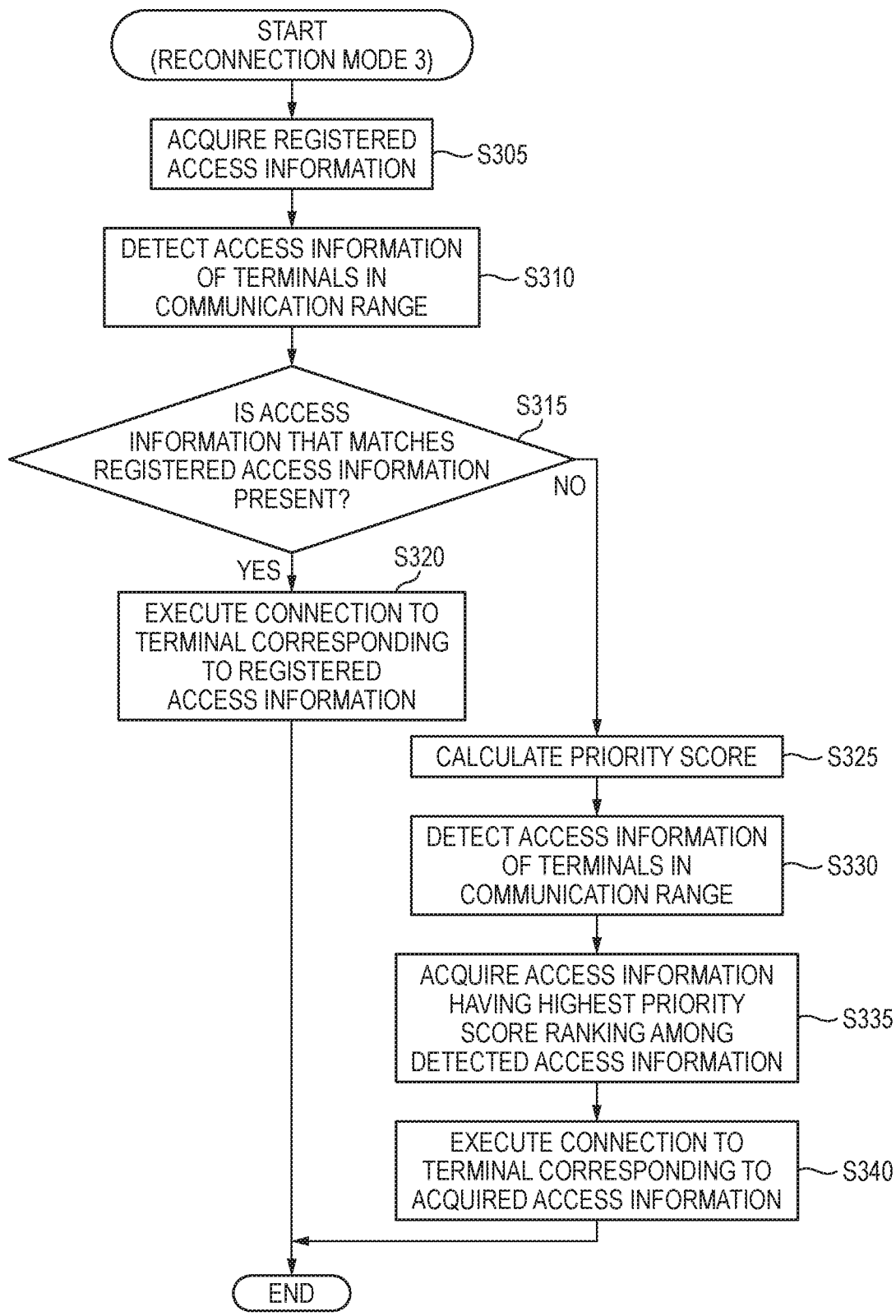
FIG. 12 is a flowchart illustrating a procedure of the reconnection mode 3 that is executed by the connection controller of the label printer.

Next, the control procedure when the reconnection mode 3 illustrated in FIG. 12 is executed will be described in detail.

In Step S305, the connection controller 201B acquires the registered access information registered in the registered access information storage unit 201*da*.

Next, the process proceeds to Step S310, and the connection controller 201B is paired with the operation terminals 2 present in the communication range R of the label printer 3 at the time and detects the access information thereof.

Next, the process proceeds to Step S315, and the connection controller 201B determines whether or not access information that matches the registered access information acquired in Step S305 is present among the access information detected in Step S310. When the access information that matches the acquired registered access information is present among the detected access information, the determination is satisfied (S315: YES), and the process proceeds to Step S320.

In Step S320, the connection controller 201B transmits a connection request to the operation terminal 2 corresponding to the registered access information and executes reconnection. Next, this flow ends.

On the other hand, When the access information that matches the acquired registered access information is not present among the detected access information in the determination of Step S315, the determination is not satisfied (S315: NO), and the process proceeds to Step S325.

In Step S325 to Step S340, the connection controller 201B executes the same control procedure as that of Step S105 to Step S120 illustrated in FIG. 10, and executes reconnection to the operation terminal 2 selected based on the priority score ranking. Next, this flow ends.

<Regarding OS of Operation Terminal that is Applicable in Embodiment>

For example, when the operation terminal 2 is a smartphone, plural kinds of operating systems (hereinafter, appropriately referred to as "OS") thereof are present, and the connection mode to the label printer 3 through wireless communication may vary depending on the OSes. For example, when the OS is iOS (registered trade name), a link key is exchanged between the label printer 3 and the operation terminal 2, and the operation terminal 2 and the label printer 3 are connected to be capable of data exchange. As a result, the connection state is established.

In this OS, basically, the connection state is maintained after print data or the like is exchanged in the connection state to the label printer 3. Therefore, it is preferable to apply the label printer 3 according to the embodiment that executes the exclusive reconnection process when the operation terminal 2 is disconnected from the connection state due to some reason.

On the other hand, when the OS is, for example, Android (registered trade name), a link key is exchanged between the label printer 3 and the operation terminal 2 such that the pairing state is established. Next, when a printing instruction is given from the label printer 3, the operation terminal 2 and the label printer 3 are connected to be capable of data exchange and changes from the pairing state to the connection state. When printing corresponding to the printing instruction ends, the connection state where the data exchange is possible is forcibly released and returns to the pairing state. In this OS, the disconnection state is automatically established after the end of printing, and it is not necessary to execute reconnection. Therefore, the autonomous reconnection by the label printer 3 according to the embodiment is not applicable.

As described above, it is desirable to determine whether or not to execute the reconnection process by the label printer 3 according to the embodiment depending on the kind of the OS of the operation terminal 2 as the connection target. Accordingly, the label printer 3 may determine whether or not to apply the reconnection process depending on the kind of the OS of the operation terminal 2 corresponding to each of the registered access information and the access information stored in the access information management table.

<Effect of Embodiment>

As described above, in the embodiment, when the operation terminal changes from the connection state to the disconnection state, in the connection process by the connection controller 201B, the connection state to the operation terminal 2 corresponding to access information having a high priority ranking among a plurality of access information stored in the access information management table is automatically established again. At this time, the priority ranking is determined based on priorities determined with the predetermined rule. As a result, when the label printer 3 and the operation terminal 2 change from the connection state to the disconnection state, a complicated operation on the operation terminal 2 side is not necessary, and the label printer 3 and the operation terminal 2 can be simply reconnected.

In particular, at this time, the rule for determining the priorities is appropriately set. As a result, reconnection to the operation terminal 2 where connection is originally preferred, for example, the operation terminal 2 that is frequently connected for printing can be reliably executed. In addition, unlike a method of simply executing reconnection to the operation terminal 2 that is previously connected, it is also possible to prevent reconnection to the operation terminal 2 where connection is not preferred. As a result, the convenience of the user in the wireless communication between the label printer 3 and the operation terminal 2 can be significantly improved.

In addition, in the embodiment, in particular, the predetermined rule is a rule in which the priority of the operation terminal 2 increases as a total score obtained by adding at least one of scores increases, the scores including: a score calculated from "the number of times of use of the operation terminal 2×A (where A represents a positive constant)"; a score calculated from "the number of times the operation terminal 2 changes from the connection state to the disconnection state irrespective of an operation from the label printer 3×B (where B represents a negative constant)"; and a score calculated from "C (where C represents a positive constant)/the number of days elapsed from a previous use".

As a result, when the number of times of use of the operation terminal 2 is large, when the number of disconnection from the operation terminal 2 is small, or when the number of days elapsed from a previous use of the operation terminal 2 is short, the total score of the operation terminal corresponding to the access information among a plurality of access information is high. Thus, the priority of the operation terminal 2 increases such that the operation terminal 2 can be reliably reconnected. The calculation formulae for the priority score are not limited to the examples illustrated in FIG. 5. The values of the respective constants A, B, and C to be applied depending on the setting mode of reconstruction, the items to be added (the items such as the number of times of connection, the number of times of disconnection, or the number of days elapsed), the calculation contents, and the like may be appropriately changed.

In addition, in the embodiment in particular, in the connection process by the connection controller 201B, the registered access information that is pre-registered is used to establish the connection state to the operation terminal 2 corresponding to the access information irrespective of the priority scores of the plurality of access information stored in the access information management table of the access information management table storage unit 201Db. As a result, the operation terminal 2 that is reliably reconnected is pre-registered such that the operation terminal 2 can be reliably reconnected irrespective of the above-described priority ranking. The number of registered access information is not limited to one and may be plural. In this case, it is desirable to set the priority ranking between the registered access information in advance.

In addition, in the embodiment, in particular, the operating system of the operation terminal 2 is an operating system (for example, iOS (registered trade name)) in which a link key is exchanged between the label printer 3 and the operation terminal 2 and the operation terminal 2 and the label printer 3 are connected to be capable of data exchange such that the connection state is established.

As a result, it is preferable to apply the label printer 3 according to the embodiment that executes the exclusive reconnection process when the operation terminal 2 is disconnected from the connection state due to some reason.

In the above description, the expression "perpendicular", "parallel", "plane", or the like does not represent the exact meaning. That is, "perpendicular", "parallel", or "plane" allows tolerance and error in design and manufacturing and represents "substantially perpendicular", "substantially parallel", or "substantially plane".

In addition, in the above description, when the expression "the same", "equal", or "differenct" is used for the dimension or size in external appearance, the expression does not represent the exact meaning. That is, "the same", "equal", or "difference" allows tolerance and error in design and manufacturing and represents "substantially the same", "substantially equal", or "substantially different".

For example, when a value as a predetermined criterion or a value as a delimiter, for example, a threshold or a reference value is described, "the same", "equal", or "different" for this expression represents the exact meaning unlike the above description.

In the above description, an arrow in each of the drawings such as FIG. 2 indicates an example of the flow of a signal and does not limit a flow direction of the signal.

The flowchart illustrated in FIG. 9, 10, 11, or 12 does not limit the present invention to the procedure illustrated in the flow, and addition, deletion, change in order, or the like may be made for the procedure within a range not departing from the scope and the technical thoughts of the present invention.

In addition to the above description, the methods of the embodiment and the respective modification examples may be appropriately combined to be used.

In addition, although not described in the specification, various changes can be made for the present invention within a range not departing from the scope thereof.

What is claimed is:

1. A printing device comprising:
   a conveying unit that is configured to convey a printing medium;
   a printing unit that is configured to perform printing on the printing medium;
   a communication unit that is configured to execute wireless communication with an external device through mutual recognition wireless communication;
   a storage unit that is configured to store information therein; and
   a controller that is configured to execute;
   an access information storage process of causing the storage unit to store access information of the external device that indicates a connection state where data exchange is being executed through the wireless communication;
   a disconnection detection process of detecting that the connection state of the external device changes to a disconnection state where the data exchange through the wireless communication is not executable; and
   a connection process of using, when the disconnection state is detected in the disconnection detection process, access information having a high priority ranking based on priorities determined with a predetermined rule among a plurality of access information stored in the storage unit to establish the connection state to the external device corresponding to the access information.

2. The printing device according to claim 1,
   wherein the predetermined rule is a rule in which the priority of the external device increases as a total score obtained by adding at least one of scores increases, the scores including:
   a first score calculated by multiplying the number of times of use of the external device by a positive constant A;
   a second score calculated by multiplying the number of times that the external device changes from the connection state to the disconnection state irrespective of an operation from the printing device by a negative constant B; and
   a third score calculated by dividing a positive constant C by the number of days elapsed from a previous use.

3. The printing device according to claim 1,
   wherein in the connection process,
   irrespective of the priorities of the access information stored in the storage unit, a pre-registered access information is used to establish the connection state to the external device corresponding to the pre-registered access information.

4. The printing device according to claim 1,
   wherein in an operating system of the external device,
   a link key is exchanged between the printing device and the external device and the external device and the printing device are connected to be capable of data exchange to establish the connection state.

5. A communication processing system comprising:
   a printing device that includes:
   a conveying unit that is configured to convey a printing medium;
   a printing unit that is configured to perform printing on the printing medium;
   a communication unit that is configured to execute wireless communication with an external device through mutual recognition wireless communication;
   a storage unit that is configured to store information therein; and
   a first controller; and
   at least one external device that includes:
   a communication unit that is configured to execute the wireless communication with the communication unit; and
   a second controller,
   wherein the first controller is configured to perform processes including:
   an access information storage process of causing the storage unit to store access information of the external device that indicates a connection state where data exchange is being executed through the wireless communication;
   a disconnection detection process of detecting that the connection state of the external device changes to a disconnection state where the data exchange through the wireless communication is not executable; and
   a connection process of using, when the disconnection state is detected in the disconnection detection process, access information having a high priority ranking based on priorities determined with a predetermined rule among a plurality of access information stored in the storage unit to establish the connection state to the external device corresponding to the access information.

6. A connection method between a printing device and an external device, the method comprising:
   causing a storage unit of the printing device to store access information of the external device that indicates a connection state where data exchange is being executed through a wireless communication between the printing device and the external device by using mutual recognition wireless communication;
   detecting that the connection state of the external device changes to a disconnection state where the data exchange through the wireless communication is not executable; and
   using, when the disconnection state is detected in the detecting, access information having a high priority ranking based on priorities determined with a predetermined rule among a plurality of access information stored in the storage unit to establish the connection state to the external device corresponding to the access information.

* * * * *